United States Patent Office 2,990,914
Patented July 4, 1961

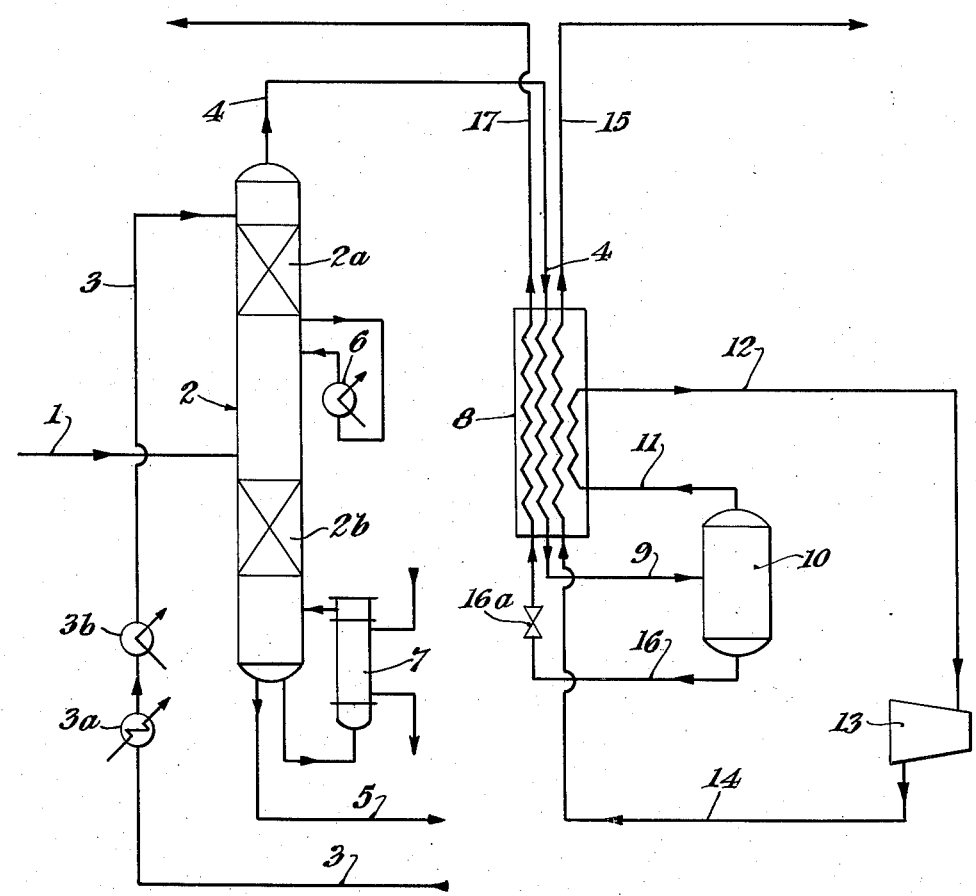

2,990,914
ABSORPTION SYSTEM
Ludwig Kniel, Scarsdale, N.Y., assignor to The Lummus Company, New York, N.Y., a corporation of Delaware
Filed Sept. 22, 1958, Ser. No. 762,397
3 Claims. (Cl. 183—115)

This invention relates to the separation of gases and more particularly relates to the efficient and effective separation of normally gaseous aliphatic hydrocarbon mixtures into a light hydrocarbon fraction and a heavy hydrocarbon fraction thereof by absorption of the heavy hydrocarbon fraction in a normally volatile lean oil wherein lean oil losses during absorption are substantially reduced.

As described in U.S. Patent No. 2,573,341, ethylene may be recovered from the various gaseous mixtures recovered as off-gases from refinery units where such gases offer a very large potential supply of hydrocarbons which do not occur naturally and which are of great importance in the synthetic chemical field. As described in U.S. Patent No. 2,796,951, acetylene and ethylene may be recovered from the gaseous mixture resulting from the pyrolysis of various hydrocarbons. The pyrolysis of various hydrocarbon feeds such as ethane and propane results in a gaseous product containing not only predominant quantities of $C_1$ to $C_5$ aliphatic hydrocarbons, but also heavier components such as benzene, naphthalene, tars and heavy oils.

Of the various separation and recovery systems available for processing pyrolytic gases or refinery off-gases, absorption systems have been widely used due to the lower initial investment and operational costs. Other factors such as quantity of product per year must be taken into account in determining the system and/or systems to be utilized for separating and recovering various components of such process gases.

Absorption systems may be classified into systems utilizing selective solvents (such as dimethylformamide to absorb acetylene) and lean oil absorption systems, wherein a normally volatile lean oil contacts a gaseous hydrocarbon mixture to be treated under conditions of temperature and pressure whereby a resolution or split of the gaseous mixture into lighter and heavier hydrocarbon fractions results. By controlling the temperature and pressure and the composition of the lean oil, various splits of the hydrocarbon mixture may be accomplished.

To illustrate the latter mentioned system, consider a gaseous hydrocarbon mixture containing ethylene and lighter and heavier hydrocarbons from which the ethylene is to be recovered. The mixture is introduced into an absorption-stripper tower and is contacted with a lean oil primarily comprised of propylene under conditions of temperature and pressure whereby ethylene and the heavier hydrocarbons are absorbed in the lean oil. The absorption of lighter hydrocarbons is minimized by stripping in the lower portion of the tower with such lighter hydrocarbons being removed as an absorber off-gas or overhead. The absorber bottoms comprising ethylene, ethane and heavier hydrocarbons absorbed in the lean oil may be separated by treating the fat oil, i.e. enriched lean oil in a deethylenizer under conditions of temperature and pressure (with necessary reflux) whereby substantially all of the ethylene is recovered as a gaseous overhead. The bottoms from such a fractionation contain, in addition to propylene and propane, and heavier hydrocarbons, ethane, which may be fractionated from the fat oil in a deethanizer to provide the lean absorption oil. The deethanizer may be operated so as to remove substantially all of the ethane or only a major portion thereof. Further, the deethylenizer bottoms may be utilized as the lean absorption oil for the absorber-stripper tower.

Since the lean oil is normally introduced into the upper portion of the absorber-stripper tower, a certain portion of the lean oil is withdrawn in the absorber overhead. If in the aforementioned example, deethylenizer bottoms are utilized as the lean absorption oil in the absorber, a portion of the ethane and propylene content of the lean oil would be withdrawn in the tower overhead or if deethanizer bottoms with substantially all of the ethane removed therefrom are utilized as the lean oil, a portion of the propylene content of the lean oil may be withdrawn in the absorber overhead. The quantity of the lean oil withdrawn in absorber overhead detracts from economical operation and consequently should be minimized.

It is a principal object of my invention to provide an efficient and economical process for separting normally gaseous aliphatic hydrocarbon mixtures into lighter and heavier hydrocarbon fractions by absorption of the heavier hydrocarbon fraction in a normally volatile lean oil wherein lean oil losses are substantially reduced.

Other objects and a fuller understanding of the invention may be had by referring to the following description taken in conjunction with the accompanying drawing, in which the figure is a schematic flow diagram illustrating a preferred embodiment of my invention for separating normally gaseous aliphatic hydrocarbon mixtures into lighter and heavier hydrocarbon fractions.

As hereinbefore described, the absorber overhead from a conventional absorption system, which is treating a pyrolytic gas and utilizes a lean oil absorption system, may contain substantial quantities of the lean oil which may not be economically recovered. The overhead (for example, obtained from the separation of a gaseous aliphatic hydrocarbon mixture into acetylene and more volatile components and into ethylene and heavier hydrocarbons, by absorption of the ethylene and heavier hydrocarbons in a lean oil primarily comprised of propylene and propane) is primarily comprised of methane and hydrogen and a minor portion of the propylene. Such a gas is normally passed to various process units as a fuel gas. If the lean oil in the absorber-stripper overhead (propylene) could be substantially reduced or recovered, absorption systems would be more economical for plants such as high capacity, acetylene, ethylene and propylene plants.

I propose to reduce lean oil losses in an absorption system (fractionating absorber tower) which separates a normally gaseous aliphatic hydrocarbon mixture into lighter and heavier fractions by absorption of the heavier fraction in a normally volatile lean oil, by partially condensing the gaseous overhead from the absorption system. Partial condensation of the gaseous overhead is performed in a novel heat exchange and condenser system wherein the heavier components in the absorber overhead, i.e. the lean oil carried over therein are separated and recovered. I accomplish this separation by passing the absorber overhead through a heat exchanger wherein the gas is cooled to a temperature sufficient to cause partial condensation of the overhead, with the condensate constituting the lean oil to be recovered from the absorber overhead. Partial condensation is accomplished by passing the absorber overhead through an indirect heat exchange relation with the uncondensed portion of the off-gas before and after expansion thereof in an expansion machine, and with vaporizing condensate. The vaporized condensate leaving the heat exchanger represents the recovered lean oil and is recycled to a processing unit upstream of the absorber or to a compressor stage by which means the pressure on the heat exchange and condenser system may be maintained.

Referring to the drawing, consider a typical pyrolytic hydrocarbon gaseous mixture (comprised of ethylene and lighter and heavier hydrocarbons) from which ethylene is to be absorbed in a lean oil. Such a pyrolytic gas is introduced from line 1 into fractionating absorber tower 2, sometimes referred to as an absorber-stripper. The tower 2 consists of an upper absorption section 2a and a lower stripping or stabilizing section 2b. Lean absorption oil in line 3, primarily comprised of propylene with minor quantities of propane and ethane, is cooled and refrigerated in exchangers 3a and 3b, respectively, and is introduced into the tower 2 and is passed in countercurrent contact with the hydrocarbon feed in line 1. Such a lean oil may be obtained as the bottoms from a deethylenizer. Tower 2 is operated so as to separate acetylene and lighter hydrocarbons which are removed as tower overhead in line 4 from the ethylene and heavier hydrocarbons which are absorbed in the lean oil and withdrawn from tower 2 as enriched lean oil through line 5.

The enriched lean oil passing through the absorption section 2a of tower 2 may be cooled in intercooler 6 during passage downwardly through such tower so as to control the absorption rate on the absorption section. An intercooler is usually necessary because the absorption reaction is exothermic and efficient absorption requires moderate temperatures. A portion of the lighter hydrocarbons may be absorbed in the lean oil during counter-current contact therewith, however such lighter fractions may be stripped from the fat oil in the lower stripping section 2b to provide a net product stream of fat oil in line 5 which is primarily comprised of ethylene and heavier hydrocarbons absorbed in the lean oil and which may be sent to a deethylenizer to recover the lean oil. Reboiler 7 is provided at the bottom of the tower 2 in order to provide the heat necessary to strip the lighter hydrocarbon fraction from the fat oil entering the stripping section.

A portion of the lean oil entering the upper portion of the tower 2 through line 3 is either entrained and/or vaporized and leaves tower 2 in line 4. For a lean oil primarily comprised of propylene and minor quantities of ethane and propane, a portion of the ethane and propylene content of the lean oil is either vaporized and/or entrained in the tower overhead in line 4.

The tower overhead in line 4 is passed through heat exchanger 8 wherein the gaseous stream is cooled to a temperature sufficient to cause partial condensation thereof. The partially condensed stream is passed through line 9 into condensate receiver drum 10. The uncondensed portion in the condensate receiver drum 10 is passed through line 11 and heat exchanger 8 and then through line 12 to expansion machine 13. The pressure of the gaseous stream in line 12 is reduced, consequently cooling the gaseous stream, and the cooled gaseous stream is then passed by line 14 through heat exchanger 8 into line 15, from which the gaseous stream is introduced into a gas main (not shown). Since condensation of the tower overhead in line 4 is controlled so as to condense primarily the lean oil entrained and/or vaporized therein, the uncondensed gaseous stream in line 11 is primarily methane and hydrogen.

The condensate in drum 10 (primarily propylene) represents the lean oil recovered from the absorber overhead and is passed by line 16 to heat exchanger 8. The quantity of the condensate passing through heat exchanger 8 is controlled by valve 16a and is of such magnitude so as to provide a substantially vaporized condensate leaving exchanger 8 in line 17. Such vaporized condensate may be returned to a processing unit upstream of the fractionating absorber 2, and represents recovered lean oil which otherwise would pass with the lighter hydrocarbon fraction to the gas main through line 15. The vaporized condensate in line 17 may be sent to a compressor stage which would determine the back pressure on the heat exchange and condenser system associated with the absorber. The compressed vaporized condensate may be re-introduced into the absorber 2.

Thus, the cooling of the gaseous absorber overhead in line 4, to partially condense such gaseous stream, is performed by passing such overhead in heat exchange relation with the uncondensed portion before and after expansion and with the vaporizing condensate.

Tables I and II are illustrative of the process streams and operational requirements, respectively, of the process route depicted in the drawing wherein ethylene and heavier hydrocarbons of a pyrolytic gaseous mixture are absorbed in a lean oil primarily comprised of propylene. Utilizing my novel heat exchange and condenser system, 83 percent of the propylene withdrawn in the absorber overhead is recovered.

TABLE I

Composition of process streams

[Mole percent]

| Components | Designation | | | | | |
|---|---|---|---|---|---|---|
| | Feed (line 1) | Lean Oil (line 3) | Bottoms (line 5) | Overhead (line 4) | Recycle (line 17) | Off-Gas (line 15) |
| Hydrogen | 13.43 | | | 25.51 | | 29.85 |
| Methane | 30.91 | | 0.28 | 58.08 | 25.87 | 63.56 |
| Ethylene | 27.02 | 1.68 | 24.51 | 1.53 | 3.07 | 1.27 |
| Acetylene | 0.56 | | 0.51 | | | |
| Ethane | 12.08 | 17.85 | 18.68 | 5.14 | 15.30 | 3.41 |
| Propylene | 13.31 | 60.13 | 42.52 | 8.46 | 48.26 | 1.69 |
| Propane | 2.49 | 14.67 | 10.06 | 1.28 | 7.50 | 0.22 |
| Butylene | 0.10 | 2.11 | 1.30 | | | |
| Butane and Heavier hydrocarbons | 0.10 | 3.56 | 2.14 | | | |
| Total | 100.00 | 100.00 | 100.00 | 100.00 | 100.00 | 100.00 |

TABLE II

Summary of operating conditions

| Designation | Pressure, p.s.i.g. | Temperature, ° F. | | | Temperature, ° F. |
|---|---|---|---|---|---|
| | | O.H. | Bottoms | Feed | |
| Fractionating Absorber (2) | 430 | −27 | 76 | −30 | |
| Lean Oil (line 3) | | | | | −30 |
| Condensate Receiver (10) | 425 | −80 | −80 | −80 | |
| Condensate (line 17) | | | | | −33 |
| Off-Gas (line 15) | | | | | −33 |

I have described my system as applying to the separation of ethylene and heavier hydrocarbons from a normally gaseous hydrocarbon mixture comprised of ethylene and lighter and heavier hydrocarbons by absorption of the ethylene and heavier hydrocarbons in a lean oil primarily comprised of propylene and minor quantities of ethane and propane. My novel method, however, for reducing lean oil losses in an absorption system by recovering and recyling lean oil entrained and/or vaporized in the absorber overhead is applicable to the separation of a normally gaseous aliphatic hydrocarbon mixtures into a light hydrocarbon fraction and into a heavy hydrocarbon fraction by absorption of the heavier hydrocarbon fraction in a normally volatile lean oil.

While I have shown and described a preferred form of my invention, I am aware that variations may be made thereto and I, therefore, desire a broad interpretation of my invention within the scope of the disclosure herein and the following claims.

I claim:

1. A process for the separation of a normally gaseous hydrocarbon mixture into a heavy hydrocarbon fraction and a light hydrocarbon fraction which comprises; feeding the gaseous mixture into the lower part of an absorption zone; passing the gaseous mixture upwardly in said absorption zone in countercurrent contact with a normally volatile hydrocarbon lean oil having at least 2 carbon atoms to the molecule and in an amount and under temperature and pressure conditions whereby substantially all of the heavy hydrocarbon fraction of said gaseous mixture is absorbed in said lean oil; withdrawing lean oil containing the absorbed heavy hydrocarbon fraction from the bottom of said absorption zone; withdrawing the light hydrocarbon fraction including undesired entrained lean oil as an unabsorbed gaseous mixture from the top of said absorption zone; passing said unabsorbed gaseous mixture through a heat exchange zone and cooling said unabsorbed gaseous mixture during such passage to a temperature sufficient to condense out a major portion of said entrained lean oil; passing the condensed lean oil and the uncondensed portion of said unabsorbed gaseous mixture into a separation zone wherein the uncondensed portion of said unabsorbed gaseous mixture is separated from said condensed lean oil as the light hydrocarbon fraction; passing said light hydrocarbon fraction through an expansion zone and thence through said heat exchange zone; passing said condensed lean oil through said heat exchange zone, the passage of said condensed lean oil through said heat exchange zone being regulated so that said condensed lean oil is substantially vaporized during such passage, the passage of said light hydrocarbon fraction and said condensed lean oil through said heat exchange zone effecting the cooling of said unabsorbed gaseous mixture; and recovering substantially vaporized lean oil from said heat exchange zone.

2. A process for the separation of a normally gaseous hydrocarbon mixture into a heavy hydrocarbon fraction and a light hydrocarbon fraction which comprises: feeding the gaseous mixture into the lower part of an absorption zone; passing the gaseous mixture upwardly in said absorption zone in countercurrent contact with a normally volatile hydrocarbon lean oil having at least 2 carbon atoms to the molecule and in an amount and under temperature and pressure conditions whereby substantially all of the heavy hydrocarbon fraction of said gaseous mixture is absorbed in said lean oil; withdrawing lean oil containing the absorbed heavy hydrocarbon fraction from the bottom of said absorption zone; withdrawing the light hydrocarbon fraction including undesired entrained lean oil as an unabsorbed gaseous mixture from the top of said absorption zone; passing said unabsorbed gaseous mixture through a heat exchange zone and cooling said unabsorbed gaseous mixture during such passage to a temperature sufficient to condense out a major portion of said entrained lean oil; passing said condensed lean oil and uncondensed portion of said unabsorbed gaseous mixture into a separation zone wherein the uncondensed portion of said unabsorbed gaseous mixture is separated from said condensed lean oil as the light hydrocarbon fraction; passing said light hydrocarbon fraction and condensed lean oil through said heat exchange zone in heat exchange relation to said unabsorbed gaseous mixture to effect the cooling of said unabsorbed gaseous mixture to the temperature required for condensing said entrained lean oil, said passage of said light hydrocarbon fraction through said heat exchange zone being comprised of two separate passes wherebetween such passes said light hydrocarbon fraction is cooled by expansion thereof; and recovering the entrained lean oil from said heat exchange zone.

3. A process for the separation of a normally gaseous hydrocarbon mixture into a heavy hydrocarbon fraction and a light hydrocarbon fraction which comprises: feeding the gaseous mixture into the lower part of an absorption zone; passing the gaseous mixture upwardly in said absorption zone in countercurrent contact with a normally volatile hydrocarbon lean oil having at least 2 carbon atoms to the molecule and in an amount and under temperature and pressure conditions whereby substantially all of the heavy hydrocarbon fraction of said gaseous mixture is absorbed in said lean oil; withdrawing lean oil containing the absorbed heavy hydrocarbon fraction from the bottom of said absorption zone; withdrawing the light hydrocarbon fraction including undesired entrained lean oil as an unabsorbed gaseous mixture from the top of said absorption zone; passing said unabsorbed gaseous mixture through a heat exchange zone and cooling said unabsorbed gaseous mixture during such passage to a temperature sufficient to condense out a major portion of said entrained lean oil; passing said condensed lean oil and said uncondensed portion of said unabsorbed gaseous mixture into a separation zone wherein the uncondensed portion of said unabsorbed gaseous mixture is separated from said condensed lean oil as the light hydrocarbon fraction; passing said light hydrocarbon fraction and condensed lean oil through said heat exchange zone in indirect heat exchange relation to said unabsorbed gaseous mixture whereby the energy represented by the pressure of said unabsorbed gaseous mixture is conserved, said unabsorbed gaseous mixture being cooled to the temperature required for condensing said entrained lean oil, said condensed entrained lean oil being heated and vaporized during its passage through said heat exchange zone, and the passage of said light hydrocarbon fraction through said heat exchange zone being comprised of two separate passes wherebetween such passes said light hydrocarbon fraction is cooled by expansion through an expansion machine; and recovering the entrained lean oil from said heat exchange zone.

References Cited in the file of this patent
UNITED STATES PATENTS

| | | |
|---|---|---|
| 2,038,834 | Frey | Apr. 28, 1936 |
| 2,601,009 | Swearingen | June 17, 1952 |
| 2,787,335 | Irvine | Apr. 2, 1957 |